US011375564B2

(12) United States Patent
Marupaduga et al.

(10) Patent No.: US 11,375,564 B2
(45) Date of Patent: Jun. 28, 2022

(54) DYNAMICALLY TRANSITIONING A UE TO STANDALONE CONNECTIVITY WITH AN ACCESS NODE BASED ON THE UE HAVING THRESHOLD LOW POWER HEADROOM ON A SECONDARY CONNECTION WITH THE ACCESS NODE

(71) Applicant: Sprint Spectrum L.P., Overland Park, KS (US)

(72) Inventors: Sreekar Marupaduga, Overland Park, KS (US); Rajveen Narendran, Olathe, KS (US); Maher Hasan, Ashbum, VA (US); Saravana Velusamy, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 90 days.

(21) Appl. No.: 17/064,883

(22) Filed: Oct. 7, 2020

(65) Prior Publication Data

US 2022/0110175 A1    Apr. 7, 2022

(51) Int. Cl.
*H04W 76/15* (2018.01)
*H04W 52/36* (2009.01)
*H04W 92/10* (2009.01)

(52) U.S. Cl.
CPC ......... *H04W 76/15* (2018.02); *H04W 52/365* (2013.01); *H04W 52/367* (2013.01); *H04W 92/10* (2013.01)

(58) Field of Classification Search
CPC . H04W 76/15; H04W 52/365; H04W 52/367; H04W 92/10; H04W 36/0069
See application file for complete search history.

(56) References Cited

U.S. PATENT DOCUMENTS

| 10,659,978 B1 | 5/2020 | Marupaduga et al. |
| 2017/0188393 A1 | 6/2017 | Uchino et al. |
| 2019/0069325 A1 | 2/2019 | Yerramalli et al. |
| 2019/0124600 A1 | 4/2019 | Papasakellariou et al. |
| 2020/0154496 A1 | 5/2020 | Yi |

OTHER PUBLICATIONS

International Search Report and Written Opinion from International Application No. PCT/US21/53632, dated Jan. 11, 2022.

*Primary Examiner* — Robert C Scheibel

(57) ABSTRACT

A method and system for dynamically controlling connectivity of a user equipment device (UE) in a wireless communication system. An example method includes (i) while the UE has dual connectivity with a first access node and a second access node, determining that power headroom of the UE on an air-interface connection between the UE and the second access node is threshold low, and (ii) responsive to at least the determining, transitioning the UE from having the dual connectivity with the first access node and the second access node to instead having standalone connectivity with the second access node. Transitioning the UE to having standalone connectivity with the second access node as to which the UE had threshold low power headroom may help to improve quality of communication between the UE and the second access node.

20 Claims, 4 Drawing Sheets

DYNAMICALLY TRANSITIONING A UE TO STANDALONE CONNECTIVITY WITH AN ACCESS NODE BASED ON THE UE HAVING THRESHOLD LOW POWER HEADROOM ON A SECONDARY CONNECTION WITH THE ACCESS NODE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/ or other wirelessly equipped communication devices (whether or not user operated), can operate. Further, each access node could be coupled with a core network that provides connectivity with various application servers and/ or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random-access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of such a system, the UE could detect threshold strong coverage of an access node on a carrier (e.g., a threshold strong reference signal broadcast by the access node on that carrier) and could then engage in random-access and connection signaling with the access node to establish an air-interface connection, such as a Radio Resource Control (RRC) connection, through which the access node will then serve the UE on the carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer (DRB) portion that extends over the air between the access node and the UE.

In relation to this connection and/or attachment process, the access node could also obtain and store in a context record for the UE a set of UE capabilities data, which could define various service features that the UE supports. For instance, the access node could obtain this data from a subscriber profile registry in the network and/or through signaling with the UE.

Once the UE is so connected and registered, the access node could then serve the UE over the air-interface connection, managing downlink air-interface communication of data to the UE and uplink air-interface communication of data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

For each such scheduled downlink or uplink communication on PRBs between an access node and a UE, the access node and UE could use a modulation and coding scheme (MCS) that is selected based on the UE's wireless channel quality, which the access node could specify in its scheduling directive to the UE.

In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or that supports more bits per resource element, and when channel quality is worse, the access node may direct use of a lower-order MCS that may have a lower coding rate and/or supports fewer bits per resource element.

Examples of modulation schemes include, without limitation, quadrature phase-shift keying (QPSK), in which each resource element represents 2 bits of data, 8 phase-shift keying (8PSK), in which each resource element represents 3 bits of data, 16 quadrature amplitude modulation (16QAM), in which each resource element represents 4 bits of data, 32QAM, in which each resource element represents 5 bits of data, 64QAM, in which each resource element represents 6 bits of data, and 256QAM, in which each resource element represents 8 bits of data.

In practice, the access node could determine the MCS to be used in a given instance based on wireless channel quality reported by the UE. For instance, as the access node serves the UE, the UE could transmit channel quality reports to the access node periodically and/or as part of the UE's scheduling requests or other communications to the access node, with each report including a channel-quality indicator (CQI) value representing the UE's determined channel quality and perhaps one or more other channel metrics such as downlink reference signal receive power (RSRP), signal-to-interference-plus-noise ratio (SINR), or the like. When the access node schedules communications to or from the UE, the access node could then map the UE's latest reported CQI value to a corresponding MCS value using a standard CQI-MCS mapping table, and the access node could direct use of that MCS in the scheduling directive that the access node sends to the UE. Communication could thus occur using that directed MCS.

In addition, a UE could be equipped with a variable-gain power amplifier and associated logic that enables the UE to transmit on the uplink with dynamically set transmit power. And as the access node serves the UE, the access node and UE could regularly engage in a power-control process to control the UE's transmit power.

In an example of such a power-control process, an uplink receiver at the access node could estimate SINR of transmission from the UE on a per subframe basis or the like and could compare that SINR with an SINR target (which might be dynamically set based on observed communication error rate). And the access node could then correspondingly transmit to the UE (e.g., in a special DCI message) a transmit power control (TCP) command that would cause the UE to either increment or decrement its transmit power. In particular, when the SINR is below the SINR target, the access node could transmit to the UE a power-up TPC command to which the UE would respond by incrementally increasing its transmit power. Whereas, when the SINR is above the SINR target, the access node could transmit to the UE a power-down TPC command to which the UE would respond by incrementally decreasing its transmit power.

The UE's ability to increase its transmit power, however, could be limited by a defined maximum transmit power level (e.g., maximum average transmit power level), e.g., a spectral absorption rate (SAR) limit, which could be established based on a power class of the UE for instance. Industry standards or governmental regulations define various UE power classes, and UEs could be characterized by their manufacturing specifications or other data to be a member of one power class or another. Without limitation, examples of such power classes include Power Class 2, defining a maximum transmit power of 23 dBm (about 200 milliwatts), and Power Class 3, defining a maximum transmit power of 26 dBm (about 400 milliwatts)

With this power limitation and the UE's variable transmit power, the UE may therefore have a variable level of power headroom that defines the difference between (i) what the UE's transmit power level is or should be based on the power-control process and (ii) the UE's maximum transmit power. Namely, the power headroom could be computed by subtracting, from a maximum transmit power limit of the UE, a transmit power at which, according to the power-control process, the UE is to transmit. A positive power-headroom value could thus mean that the UE has transmit power to spare and can increase its transmit power more if directed to do so, whereas a zero or negative power-headroom value could mean that the UE has already reached its maximum transmit power level and may therefore be unable to transmit with sufficient power.

Each time the UE sends a scheduling request to the access node, the UE could include in the scheduling request a power-headroom report (PHR) indicating the UE's current power headroom. (Such a report may effectively indicate the UE's power headroom by providing an index value that maps to the UE's current power headroom or to a range encompassing the UE'S current power headroom.) And the access node could use that reported power headroom as a basis to set or adjust the MCS that the access node will direct the UE to use for uplink transmission. If the power headroom is negative, for instance, the access node might artificially reduce the MCS-order from the MCS that corresponds with the UE's reported CQI.

In addition, when an access node serves a UE, the access node and UE may also support various additional services that help provide the UE with increased peak data rate and improved quality of communications. Without limitation, an example of such service is dual connectivity service, where a UE is served concurrently on multiple air-interface connections.

Dual-connectivity service can be especially beneficial and desirable as the industry advances from one RAT to another, as dual-connectivity in that scenario could involve a UE being served concurrently on a connection according to a legacy RAT and a connection according to a newer and possibly technically-superior RAT. For instance, as the industry advances from 4G LTE to 5G NR, 4G-5G dual-connectivity service such as to as EUTRA-NR Dual Connectivity (EN-DC) may allow the UE to operate concurrently with both a legacy 4G LTE connection and a possibly higher throughput 5G NR connection. Such dual-connectivity service, or "non-standalone" (NSA) service, could be distinguished from standalone (SA) service, where the UE is connected and served according to just a single RAT, such as just 4G LTE or just 5G NR.

In an example dual-connectivity implementation, the UE would have at least two separate and co-existing air-interface connections, including a primary connection with a first access node that functions as the UE's master node (MN) and a secondary connection with a second access node that functions as a secondary node (SN) to provide the UE with added bandwidth for user-plane communications. In particular, the access node with which the UE initially connects as noted above could function as the UE's MN and, as such, could be the anchor point for both key RRC signaling and core-network control signaling for service of the UE and could also be responsible for coordinating setup, management, and teardown of dual connectivity for the UE.

Once the UE has established its primary connection with an access node as noted above and has attached with the core network, the UE's serving access node may then engage in a process to establish dual connectivity for the UE. In particular, operating as MN, that access node could engage in signaling to add for the UE a secondary connection with an SN and to establish for the UE a split bearer so that the MN and SN could then concurrently serve the UE, each over its respective connection with the UE.

With dual connectivity established for the UE, each access node could then serve the UE respectively in the manner discussed above, scheduling downlink communication on its respective connection with the UE and scheduling uplink communication on its respective connection with the UE.

Further, for each of the UE's connections, the UE could apply a respective variable gain for its transmit power and could engage in a respective power-control process with the respective serving access node as discussed above.

But with dual connectivity, the UE's maximum transmit power (e.g., maximum average transmit power level) could apply to restrict the UE's aggregate transmit power across the UE's primary and secondary connections, i.e., requiring that the sum total of the UE's transmit power on those co-existing connections (e.g., the UE's maximum average aggregate transmit power level) to not exceed the limit. Therefore, the UE could apply a dynamic power sharing process to distribute its limited uplink transmit power across its connections.

In an example dynamic power sharing process, the UE could apply its maximum transmit power limit to its primary connection and, on a per subframe (or other TTI) basis, could treat any remaining transmit power as the UE's maximum transmit power limit for its secondary connection. More particularly, on a per subframe basis, the UE and MN could engage in a power-control process as described above to establish the UE's transmit power on the UE's primary connection, capped by the UE's maximum transmit power. And for that subframe, the UE could then dynamically treat the UE's power headroom on the primary connection (or zero if negative) as being the UE's maximum transmit power on the secondary connection. Further, the UE and SN could likewise engage in a power-control process as described above, to establish the UE's transmit power for that same subframe on the secondary connection, capped by the dynamically established maximum transmit power.

One technical problem that can arise in a scenario where a UE is served with dual connectivity and engages in dynamic power sharing is that the UE could end up with very low (possibly negative) power headroom on its secondary connection. Various factors could contribute to this. First, if the UE has very low (possibly negative) power headroom on its primary connection, then the UE's maximum transmit power for its secondary connection would be very low or zero. Further, if the UE's receives power-up TPC commands for its secondary connection, especially if the UE's maximum transmit power for its secondary connection is already low, then the UE's power headroom on its secondary connection could become especially low and possibly negative.

Unfortunately, very low (possibly negative) power headroom on the UE's secondary connection could result in the UE experiencing dramatically reduced throughput on the UE's secondary connection. Especially in scenario as noted above where the secondary connection operates according to a newer and possibly technically-superior RAT, but also possibly in other scenarios, this result could be undesirable.

The present disclosure provides a mechanism to help address this problem.

In accordance with the disclosure, when a UE is served with dual connectivity on a primary connection with a first access node and a secondary connection with a second access node, the first access node will detect when the UE's power headroom on the secondary connection with the second access node is threshold low. And in response to detecting that the UE's power headroom on the secondary connection with the second access node is threshold low, the first access node will transition the UE from being primarily connected with the first access node to instead being primarily connected with the second access node. For instance, the first access node could responsively (i) de-configure the UE's dual connectivity, thus returning the UE to standalone connectivity served by the first access node and then (ii) hand over the UE from standalone connectivity with the first access node to standalone connectivity with the second access node.

Optimally, transitioning the UE to the access node as to which the UE had threshold low power headroom could enable the UE to be served by that access node with higher power headroom and thus possibly with improved quality of service. And especially in a scenario like that described above, but also possibly in other scenarios, this could be a beneficial result.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G LTE access node (e.g., 4G evolved Node-B (eNB)) functions as the MN, and a 5G NR access node (e.g., 5G next-generation Node-B (gNB)) functions the SN. Thus, a UE could first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE. It should be understood, however, that the principles disclosed herein could extend to apply with respect to other scenarios as well, such as with respect to other RATs and other dual-connectivity configurations, including possibly a single-RAT dual-connectivity arrangement. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
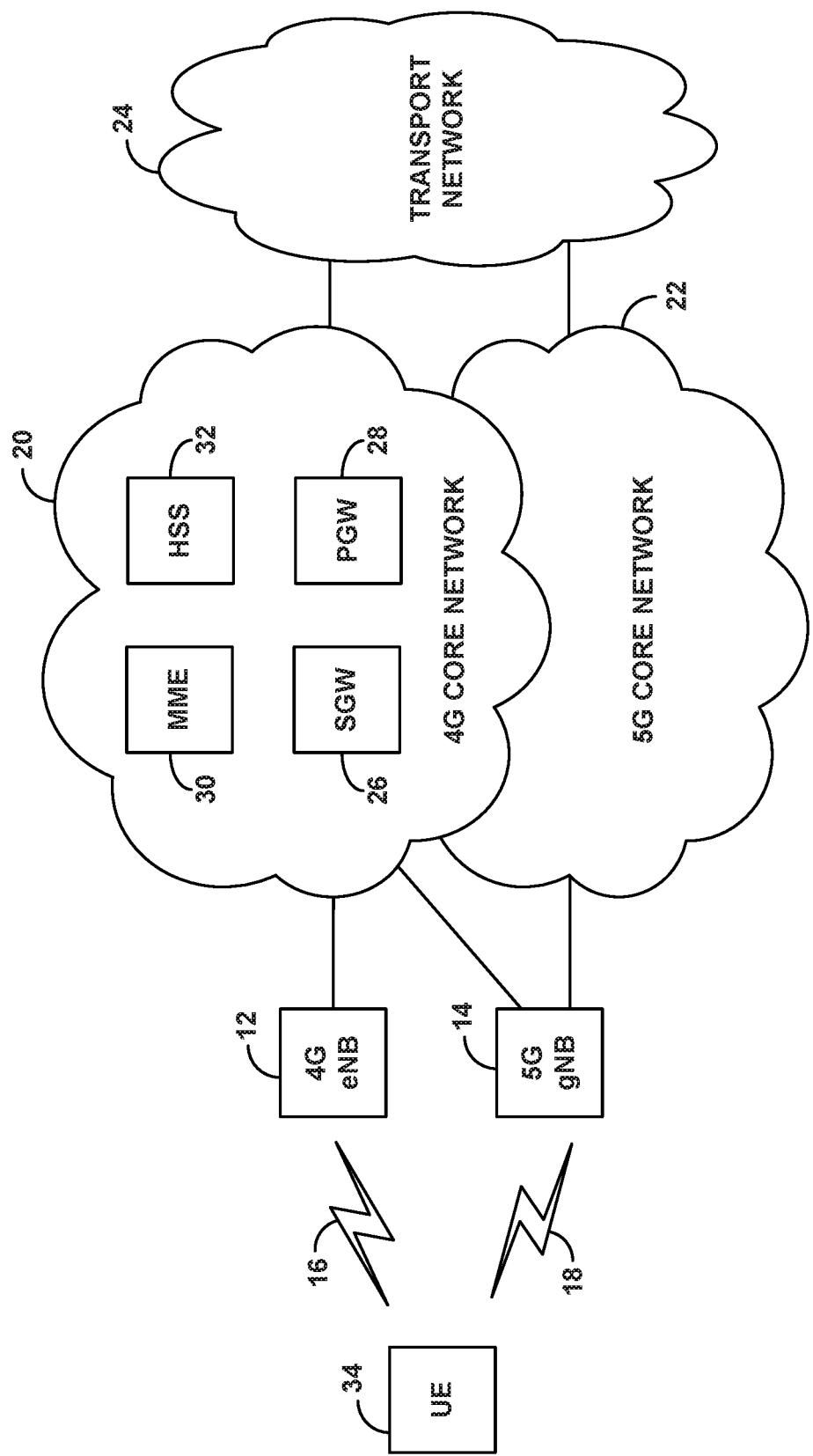
FIG. 1 is a simplified block diagram of an example network arrangement in which features of the present disclosure can be implemented.

Referring to the drawings, FIG. 1 is a simplified block diagram of an example network arrangement having a 4G eNB 12 and a 5G gNB 14. These access nodes could be macro access nodes of the type configured to provide a wide range of coverage or could take other forms, such as small cell access nodes, relays, femtocell access nodes, or the like, possibly configured to provide a smaller range of coverage. Further, the access nodes could be collocated with each other, e.g., at a common cell site with collocated RF points of origin, or could be separately located. Either way, the access nodes could be optimally configured to provide overlapping coverage in order to support EN-DC service.

In the example illustrated, the 4G eNB 12 is configured to provide 4G coverage and service on at least one 4G carrier 16, and the 5G gNB 14 is configured to provide 5G coverage and service on at least one 5G carrier 18. To facilitate providing service and coverage on the illustrated carriers, the access nodes could have a respective antenna structures, such as an antenna array, that is configured to transmit and receive electromagnetic signals in a region defined by an antenna pattern or radiation pattern, or the access nodes could share portions of a common antenna array for this purpose. And the access nodes could include other communication equipment, such as baseband units, radio heads, power amplifiers, and the like.

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown in FIG. 1, the example arrangement includes two core networks, designated as a 4G core network 20 and a 5G core network 22, each providing connectivity with an external transport network 24 such as the Internet for instance.

Each of these core networks could be a packet-switched network supporting virtual-packet tunnels or other interface between network nodes. And each network could both a user-plane subsystem through which UE bearer communications could flow to and from the transport network 24, and a control-plane subsystem supporting functions such as UE authentication, mobility management, and bearer management, among others. The 4G and 5G core networks, however, may differ from each in various ways, with the 5G core network offering certain advantages. For instance, the 5G core may provide greater separation of control-plane and user-plane functions and may facilitate advanced slicing or other options that offer improved quality of service and other benefits compared with the 4G core network.

In the example arrangement shown, both the 4G eNB 12 and 5G gNB 14 are interfaced with the 4G core network 20, but of those two access nodes, just the 5G gNB 14 is interfaced with the 5G core network 22. In practice, the 4G core network 20 would be the core network for UEs served with standalone 4G connectivity by the 4G eNB 12 and for UEs served with EN-DC by the 4G eNB 12 as MN and the 5G gNB 14 as an SN. Whereas, the 5G core network 22 would be the core network for UEs served with standalone 5G connectivity by the 5G gNB 14. For simplicity, and for present purposes, representative elements of the 4G core network 20 are shown, but details of the 5G core network 22 are not shown.

As illustrated, the 4G core network 20 could include a serving gateway (SGW) 26, a packet data network gateway (PGW) 28, a mobility management entity (MME) 30, and a home subscriber server (HSS) 32, although other arrangements are possible as well.

In an example implementation, without limitation, the 4G eNB 12 and 5G gNB 14 could each have an interface with the SGW 26, the SGW 26 could have an interface with the PGW 28, and the PGW 28 could provide connectivity with the transport network 24. Further, the 4G eNB 12 could have interfaces with the 5G gNB 14 and with the MME 30, and the MME 30 could have an interface with the SGW 26, so that the MME 30 could coordinate setup of bearers for UEs to enable the UEs to engage in packet-data communications on the transport network 24. And the HSS 32 could store or have access to UE profile records, which could specify service-subscription plans, UE configurations, and/or other such UE capability information, such as whether a UE is EN-DC capable for instance.

FIG. 1 also illustrates an example UE 34 within coverage of both the 4G eNB 12 and the 5G gNB 14. This UE could take any of the forms noted above among other possibilities. And the UE could be equipped with both a 4G LTE radio and a 5G NR radio and include associated circuitry and logic that enables the UE to engage in 4G LTE service, 5G NR service, and EN-DC service. Further, in line with the discussion above, the 4G eNB 12 could be configured to support providing this UE with standalone 4G service using 4G core network 20, the 4G eNB 12 and 5G gNB 14 could be configured to support providing the UE with EN-DC service also using the 4G core network 20, and the 5G gNB 14 could be configured to support providing the UE with standalone 5G service using the 5G core network 22.

In an example implementation, upon entering into coverage of cell site 12, the UE could initially scan for 4G coverage and could discover threshold strong coverage of the 4G eNB 12 on a 4G carrier 16, and the UE could then responsively engage in random access and RRC signaling with the 4G eNB 12 to establish a 4G connection between the UE and the 4G eNB 12 on that 4G carrier 20. Further, the 4G eNB 12 could establish in data storage a context record for the UE indicating the UE's connection state, including for instance an indication of the 4G carrier 20 on which the UE is connected with the 4G eNB 12. And the 4G eNB 12 may also add one or more additional 4G carriers 16 to the UE's 4G connection to provide the UE with 4G carrier-aggregation service.

Once the UE is connected with the 4G eNB 12, if the UE is not already registered with the 4G core network 20, the UE could then also transmit to the 4G eNB 12 an attach request message, which the 4G eNB 12 could forward to the MME 30 for processing. And upon authenticating and authorizing the UE for service, the MME 30 and 4G eNB 12 could coordinate setup for the UE of at least one user-plane bearer. For instance, the MME 30 could engage in signaling with the 4G eNB 12 and the SGW 26 to coordinate setup for the UE of an S1-U packet tunnel between the 4G eNB 12 and the SGW 26, and the SGW 26 could responsively engage in signaling with the PGW 28 to coordinate setup for the UE of an associated S5 packet tunnel between the SGW 26 and the PGW 28. Further, the 4G eNB 12 could engage in signaling with the UE to establish for the UE an associated data radio bearer (DRB).

Once the UE is connected with the 4G eNB 12 and registered with the 4G core network 20, the 4G eNB 12 could then serve the UE with wireless packet-data communications as noted above. For instance, when the PGW 28 receives data on the transport network 24 for transmission to the UE, that data could flow via the UE's access bearer to the 4G eNB 12, and the 4G eNB 12 could coordinate transmission of that data from the 4G eNB 12 to the UE on downlink PRBs of the 4G carrier(s) 16 of the UE's 4G connection. And when the UE has data for transmission on the transport network 24, the UE could transmit a scheduling request to the 4G eNB 12, the 4G eNB 12 could coordinate transmission of that data from the UE to the 4G eNB 12 on uplink PRBs of the 4G carrier(s) 16, and the data could then flow via the UE's access bearer to the PGW 28, for output on the transport network 18.

In addition, in relation to the UE's connection and/or attachment process or at another time, the 4G eNB 12 could also obtain capabilities data regarding the UE and could store the capabilities data in the UE context record for reference while serving the UE. For instance, during the attachment process, the MME 30 could obtain this data from the HSS 32 and could convey the data to the 4G eNB 12 for storage. Alternatively or additionally, the 4G eNB 12 could transmit to the UE an RRC message carrying a UE-capability enquiry, and the UE could respond to the 4G eNB 12 with a "UE capability information" information element (IE) specifying UE capabilities data. And this capabilities data could indicate that the UE supports EN-DC.

As the example UE supports EN-DC, the 4G eNB 12, operating as MN, could then work to configure EN-DC service for the UE. In particular, the 4G eNB 12 could first identify the 5G gNB 14 and one or more 5G carriers 18 to be used for a secondary 5G connection for the UE, perhaps based on the UE scanning for 5G coverage and reporting to the 4G eNB 12 that the UE detected threshold strong coverage of 5G gNB 14 on one or more such carriers. And the 4G eNB 12 could then engage in signaling to set up EN-DC service for the UE so that the UE can be served concurrently by the 4G eNB 12 and the 5G gNB 14.

For instance, the 4G eNB 12, operating as MN, could first engage in process to add for the UE a 5G connection with the 5G gNB 14, such as by transmitting to the 5G gNB 14 an SN-Addition request to cause the 5G gNB to allocate resources for that 5G connection, receiving an SN-Addition-Request acknowledge message from the 5G gNB 14, and engaging in associated RRC signaling with the UE, in response to which the UE could then access and complete establishment of the 5G connection with the 5G gNB 14. Further, to help offload some processing from the 4G eNB 12 and to take advantage of possibly higher throughput offered by the 5G connection as compared with the 4G connection, the 4G eNB 12 could engage in signaling to transfer to the UE's access bearer (e.g., S1-U tunnel) to the 5G gNB 14 as well and to coordinate setup for the UE of a split bearer to enable the UE's data communication to be split between the 4G eNB 12 and 5G gNB 14.

With EN-DC service so set up, the 4G eNB 12 and 5G gNB 14 could then concurrently serve the UE over their respective connections with the UE, with the UE's data flow being split between the UE's 4G and 5G connections.

For instance, when the PGW 28 receives data on the transport network 24 for transmission to the UE, that data could flow via the UE's access bearer to the 5G gNB 14, the 5G gNB 14 could split that data into first and second portions and (i) could send the first portion to the 4G eNB 12 for transmission by the 4G eNB 12 over the UE's 4G connection to the UE and (ii) could itself transmit the second portion over the UE's 5G connection to the UE.

And when the UE has data for transmission on the transport network 24, the UE could split that data into first and second portions and (i) could send the first portion over the UE's 4G connection to the 4G eNB 12, which the 4G eNB 12 could then pass to the 5G gNB 14, from where the data could flow over the UE's access bearer for output on the transport network 24 and (ii) could send the second portion over the UE's 5G connection to the 5G gNB 14, from where that data as well could flow over the UE's access bearer for output on the transport network 24.

To facilitate power control as noted above, the UE could include a variable-gain power amplifier respectively for each of the UE's connections, and the UE could engage in a power-control process on a subframe basis or other basis respectively for each connection. Thus, each time the 4G eNB 12 receives a data transmission from the UE, the 4G eNB 12 could evaluate the receive SINR of that transmission and, based on a set-point comparison, could then transmit to the UE (e.g., in a DCI message) a power-down or power-up TPC command to adjust the UE's transmit power on the UE's 4G connection. And likewise, each time the 5G gNB 14 receives a data transmission from the UE, the 5G eNB 14 could evaluate the receive SINR of that transmission and, based on a set-point comparison, could then transmit to the UE (e.g., in a DCI message) a power-down or power-up TPC command to adjust the UE's transmit power on the UE's 5G connection.

Further, as discussed above, the UE may be required to limit its maximum aggregate transmit power to a particular level based on the UE's power class, such as 23 dBm or 26 dBm for instance, and the UE could apply dynamic power sharing to facilitate this.

Thus, as discussed above, the UE could regularly compute, as its power headroom on its 4G connection, the difference between its maximum transmit power and what its current transmit power should be based on the 4G TPC commands that it has received. And the UE could then treat that computed power headroom as the UE's maximum transmit power on its 5G connection. Accordingly, the UE could likewise regularly compute, as its power headroom on its 5G connection, the difference between that dynamically set maximum 5G-connection transmit power.

As further discussed above, each access node serving the UE could determine an MCS to configure for air-interface communication between the UE and the access node. Namely, the access node could determine the MCS based on CQI reporting from the UE. And further, for uplink communication, the access node could receive from the UE a report of the UE's power headroom on the connection between the UE and the access node, and the access node could use that reported power headroom as a basis to determine the MCS to configure for uplink communication from the UE, possibly artificially lowering the UE's MCS order if the UE has negative power headroom for instance.

In line with the discussion above, in this example scenario, the present disclosure could address a problem where the EN-DC-connected UE's power headroom on its 5G connection is threshold low. Namely, when the UE's power headroom on its 5G connection is threshold low (possibly once it has been threshold low for a long enough period), the 4G eNB 12 could responsively hand over the UE to the 5G gNB 14 to allow the UE to be served with standalone 5G service.

In general, providing a UE with EN-DC service may be more desirable than providing the UE with standalone 4G service, and providing a UE with standalone 5G service may also be more desirable than providing the UE with standalone 4G service. At least as to the uplink, it follows that, if the UE is EN-DC connected and has such low power headroom on its 5G connection that the UE's uplink user-plane service on the 5G connection may be very limited or blocked, it may be better for the UE to transition from EN-DC connectivity to standalone 5G service.

In a non-limiting example implementation of this process, as the 4G eNB 12 and 5G gNB 14 are serving the UE with EN-DC, the 4G eNB 12 could first determine (e.g., learn) when the UE's 5G power headroom (i.e., the UE's power headroom on the UE's 5G connection) is at least as low as a predefined threshold level that is deemed to be undesirably low. This threshold level could be a positive value that is especially low or could be zero (or for that matter a negative number), in any case possibly posing a severe restriction on the UE's ability to engage in uplink user-plane communication on the UE's 5G connection.

The 4G eNB 12 could make this determination in various ways. By way of example, the 4G eNB 12 may be able to make this determination by simply noting that the UE's reported 4G power headroom (i.e., the UE's power headroom on the UE's 4G connection) is so low that, using that 4G power headroom as the UE's maximum uplink power on the UE's 5G connection, the UE's 5G power headroom has to be threshold low. Alternatively, the UE and/or 5G gNB 14 could report to the 4G eNB 12 when the UE's 5G power headroom is threshold low, and the 4G eNB 12 could thus make the determination by receiving this report.

As noted briefly above, at issue here could be when the UE's 5G power headroom is threshold low for a threshold period of time, to help ensure that the issue is not an aberration. Thus, the 4G eNB 12 could determine that the UE's 5G power headroom is threshold low based on it being threshold low for at least a predefined threshold period of time deemed long enough to be a problem.

Once the 4G eNB 12 determines that the UE's 5G power headroom is threshold low, the 4G eNB 12 could then respond to at least that determination by handing the UE over to be provided with standalone 5G service by the 5G gNB 14. (Here, the handover would be to the 5G gNB as to which the UE, when EN-DC connected, has the threshold low 5G power headroom. In an alternative arrangement, if the UE has multiple 5G gNBs functioning as the UE's SNs for the EN-DC service, this handover could be to one such 5G gNB. And in yet another arrangement, the handover could potentially be to a different 5G gNB altogether.)

To hand the UE over to receive standalone service by the 5G gNB 14, the 4G eNB 12 could first de-configure the UE's EN-DC. Namely, the 4G eNB 12 could reverse the processing noted above, and could therefore arrange to transfer the UE's access bearer back to the 4G eNB 12 and to tear down the UE's secondary 5G connection with the 5G gNB 14, thus transitioning the UE back to standalone 4G service. And the 4G eNB 12 could then orchestrate as straight inter-RAT handover of the UE from the 4G eNB 12 to the 5G gNB 14, perhaps engaging in conventional handover signaling with the 5G gNB 14 and then releasing and redirecting the UE to be served by the 5G gNB 14. Other handover mechanisms could be used as well.

In the example implementation, this process could thus transition the UE from having threshold low 5G power headroom on a connection with the 5G gNB 14 to having possibly much higher 5G power headroom on a connection with the 5G gNB 14, which may enable the UE to benefit from higher 5G quality of service. Further, handing the UE over to standalone 5G service that would use the 5G core network 22 rather than the 4G core network 20 may also contribute to improved quality of service for the UE.

Figure 2:
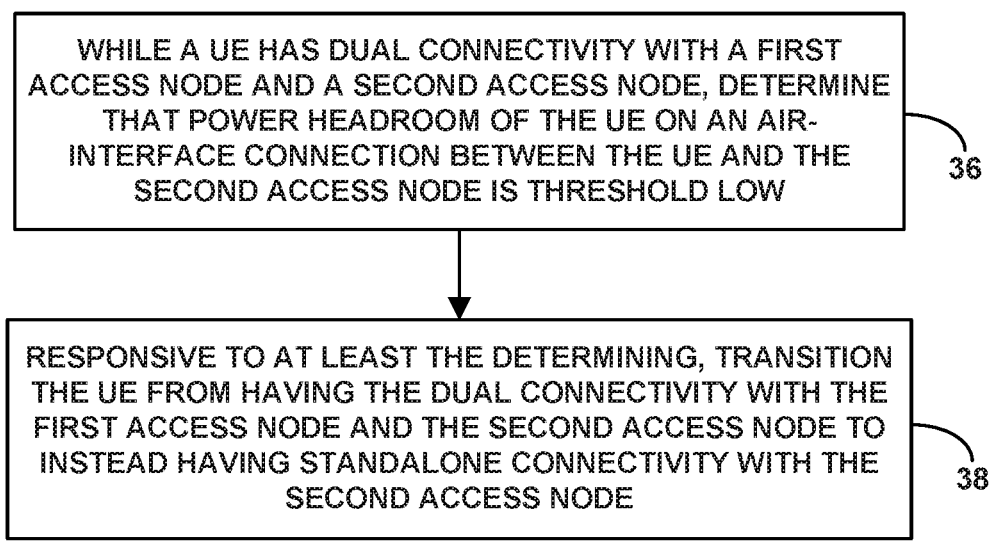
FIG. 2 is a flow chart depicting an example method in accordance with the disclosure.

FIG. 2 is a flow chart depicting a method that could be carried out in accordance with the present disclosure, to dynamically control connectivity of a UE in a wireless communication system that includes a first access node and a second access node. As shown in FIG. 2, at block 36, the method includes, while the UE has dual connectivity with the first access node and the second access node, determining that power headroom of the UE on an air-interface connection between the UE and the second access node is threshold low (e.g., is at least as low as a predefined low-threshold level). And at block 38, the method includes, responsive to at least the determining, transitioning the UE from having the dual connectivity with the first access node and the second access node to instead having standalone connectivity with the second access node.

In line with the discussion above, in the dual connectivity, the first access node could be a master serving node of the UE, and the second access node could be a secondary serving node of the UE. Further, the method could be carried out by (e.g., by or for) the first access node, among other possibilities.

As discussed above, the act of determining that the power headroom of the UE on the air-interface connection between the UE and the second access node is threshold low could involve receiving a report indicating that the power headroom of the UE on the second air-interface connection is threshold low. For instance, this could involve (i) receiving a report that specifies that the power headroom of the UE on the second air-interface connection is threshold low and/or (ii) receiving a report that specifies power headroom of the UE on the second air-interface connection, the specified power headroom being threshold low.

Further, as discussed above, in the dual connectivity, the UE could apply dynamic power sharing to control uplink transmit power of the UE, with the dynamic power sharing process including using power headroom of the UE on an air-interface connection between the UE and the first access node as a basis to set a maximum uplink transmit power limit of the UE on the air-interface connection between the UE and the second access node. In that case, threshold low power headroom of the UE on the air-interface connection between the UE and the first access node could correlate with threshold low power headroom on the air-interface connection between the UE and the second access node, so the act of determining that the power headroom of the UE on the air-interface connection between the UE and the second access node is threshold low could involve determining that the power headroom of the UE on the air-interface connection between the UE and the first access node is threshold low.

As additionally discussed above, the power headroom of the UE on the air-interface connection between the UE and the second access node could be computed by subtracting, from a maximum transmit power limit of the UE on the air-interface connection, a transmit power at which, according to a power-control process, the UE is to transmit on the air-interface connection. In that case, as noted above, the power headroom could be positive if the power at which the UE is to transmit on the air-interface connection is lower than the maximum transmit power limit of the UE on the air-interface connection, and the power headroom could be negative if the power at which the UE is to transmit on the air-interface connection is higher than the maximum transmit power limit of the UE on the air-interface connection.

Further, as discussed above, the act of transitioning the UE from having the dual connectivity with the first access node and the second access node to instead having the standalone connectivity with the second access node could involve (i) first transitioning the UE from having the dual connectivity with the first access node and the second access node to instead having standalone connectivity with the first access node and (ii) then transitioning the UE from having the standalone connectivity with the first access node to instead having the standalone connectivity with the second access node.

Still further, as discussed above, the dual connectivity could be EN-DC (e.g., using a 4G core network), the standalone connectivity with the first access node could be 4G LTE connectivity (e.g., using the 4G core network), and the standalone connectivity with the second access node could be 5G NR connectivity (e.g., using a 5G core network).

Figure 3:
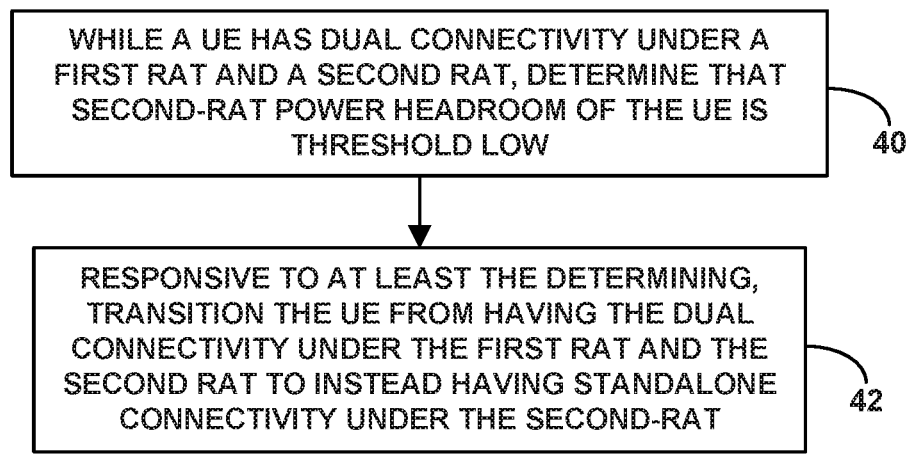
FIG. 3 is another flow chart depicting an example method in accordance with the disclosure.

FIG. 3 is next another flow chart depicting a method that could be carried out in accordance with the present disclosure, to dynamically control connectivity of a UE in a wireless communication system. This flow chart helps illustrate that implementation could be with respect to first-RAT and second-RAT connectivity of the UE, possibly with respect to a master cell group (MCG) according to a first RAT and a secondary cell group (SCG) according to a second RAT, among other possibilities.

As shown in FIG. 3, at block 40, the method includes, while UE has dual connectivity under a first RAT and a second RAT, determining that second-RAT power headroom of the UE is threshold low. And at block 42, the method includes, responsive to at least the determining, transitioning the UE from having the dual connectivity under the first RAT and the second RAT to instead having standalone connectivity under the second-RAT.

Various features discussed herein could be implemented in this context as well, and vice versa.

For example, in the dual connectivity, the UE could apply dynamic power sharing to control uplink transmit power of the UE, with the dynamic power sharing process including using first-RAT power headroom of the UE as a basis to set a maximum second-RAT transmit power limit of the UE. Further, with the dynamic power sharing, threshold low first-RAT power headroom of the UE could correlate with threshold low second-RAT power headroom of the UE, in which case the act of determining that the second-RAT power headroom of the UE is threshold low could involve determining that the first-RAT power headroom of the UE is threshold low.

Figure 4:
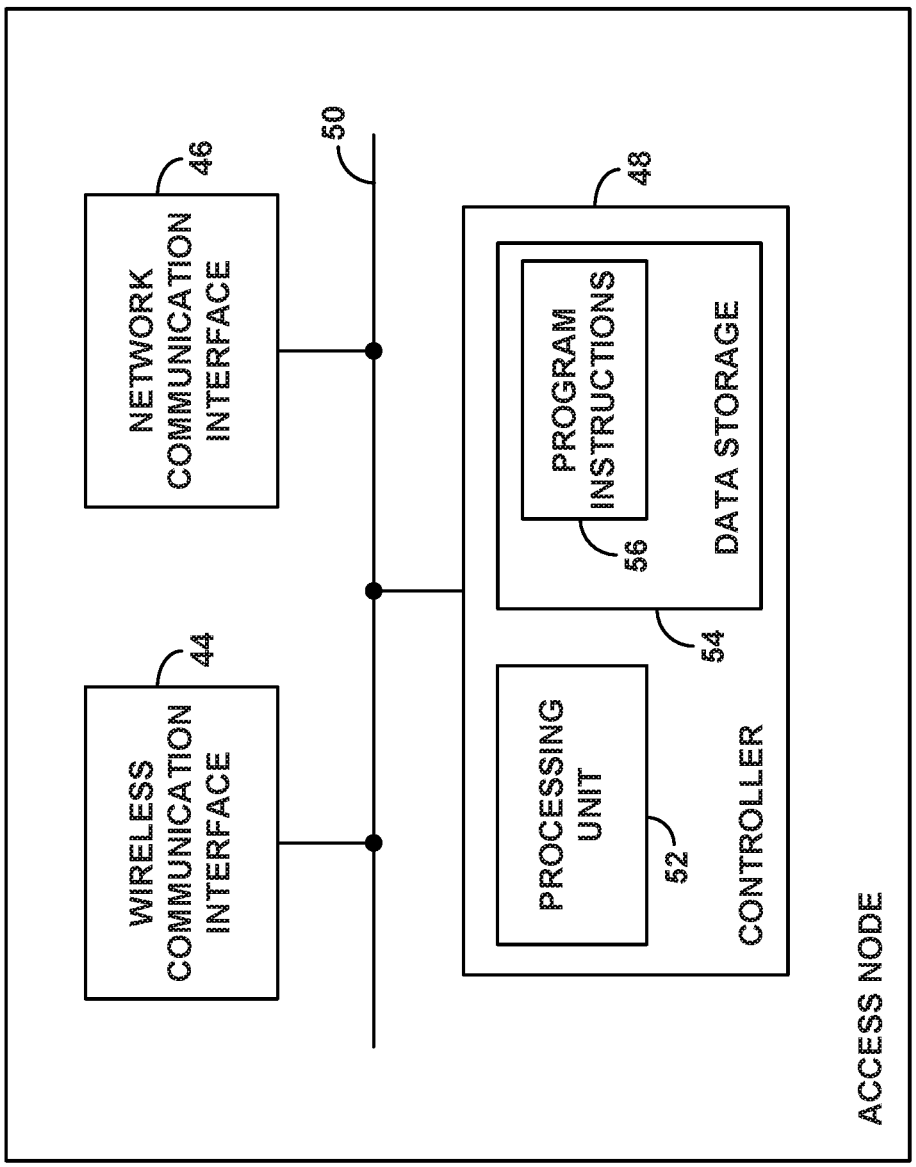
FIG. 4 is a simplified block diagram of an example access node operable in accordance with the disclosure.

FIG. 4 is next a simplified block diagram of an access node, showing some of the components that could be included to facilitate carrying out various operations as described herein. This access node could represent one of the access nodes described above, among other possibilities.

As shown, the example access node includes a wireless communication interface 44, a network communication interface 46, and a controller 48, all of which could be integrated together and/or communicatively linked together by a system bus, network, or other connection mechanism 50.

In this example arrangement, the wireless communication interface 44 could be configured to provide cellular coverage and service on one or more carriers according to a particular RAT, such as to serve a UE over an air-interface connection in accordance with the RAT for instance. As such, the wireless communication interface 44 could comprise an antenna structure, which could be tower mounted or could take other forms, and associated components such as a power amplifier and a wireless transceiver.

Further, network communication interface 46 could comprise a wired or wireless interface, such as an Ethernet network communication interface and associated logic (e.g., protocol stacks), through which the access node could engage in backhaul communication, such as with other access nodes and various core network entities.

Controller 48 could then comprise control logic to cause the first access node to carry out various operations including those discussed herein. As such, the controller 48 could take various forms, including but not limited to at least one processing unit 52 including one or more processors (e.g., general purpose microprocessors and/or dedicated processing units) and non-transitory data storage 54 (e.g., one or more volatile and/or non-volatile storage components, such as magnetic, optical, or flash storage) holding, storing, encoded with, or otherwise embodying or having program instructions 56, which could be executable by the processing unit 52 to cause the access node to carry out various operations described herein.

In an example implementation, the access node of FIG. 4 could be the first access node as discussed above, in a wireless communication system that includes the first access node and a second access node, where the first access node and second access node support cooperatively providing the UE with dual-connectivity service in which the UE is concurrently (i) primarily connected with and served by the first access node over a first air-interface connection between the UE and the first access node and (ii) secondarily connected with the second access node over a second air-interface connection between the UE and the second access node.

In this example implementation, the operations could include, while the first and second access nodes are providing the UE with the dual-connectivity service, determining that power headroom of the UE on the second air-interface connection between the UE and the second access node is threshold low. Further, the operations could include, responsive to at least the determining while the first and second access nodes are providing the UE with the dual-connectivity service that the power headroom of the UE on the second air-interface connection is threshold low, handing over the UE from being primarily connected with the first access node to being primarily connected instead with the second access node.

Various features described herein could be applied in this context as well, and vice versa.

For instance, in the dual-connectivity service, the UE could apply dynamic power sharing to control uplink transmit power of the UE on the first and second air-interface connections, with the dynamic power sharing process includes using power headroom of the UE on the first air-interface connection as basis to set a maximum transmit power limit of the UE on the second air-interface connection. And in that case, the operation of determining that the power headroom of the UE on the second air-interface connection is threshold low could involve determining that the power headroom of the UE on the first air-interface connection is threshold low.

Further, the operation of determining that the power headroom of the UE on the second air-interface connection is threshold low could involve receiving a report indicating that the power headroom of the UE on the second air-interface connection is threshold low.

Still further, the power headroom of the UE on the second air-interface connection could be computed by subtracting, from a maximum transmit power limit of the UE on the second air-interface connection, a transmit power at which, according to a power-control process, the UE is to transmit on the second air-interface connection. And in that case, the power headroom could be positive if the power at which the UE is to transmit on the second air-interface connection is lower than the maximum transmit power limit of the UE on the second air-interface connection, and the power headroom could be negative if the power at which the UE is to transmit on the second air-interface connection is higher than the maximum transmit power limit of the UE on the second air-interface connection.

Yet further, the operation of handing over the UE from being primarily connected with the first access node to being primarily connected instead with the second access node could involve (i) de-configuring the dual-connectivity service of the UE to transition the UE to standalone connectivity with the first access node and (ii) then handing over the UE from the standalone connectivity with the first access node to standalone connectivity instead with the second access node.

And still further, as discussed above, the dual-connectivity service could be EN-DC service in which the first access node provides the UE with 4G LTE service and the second access node provides the UE with 5G NR service. And in that case, the operation of handing over the UE from being primarily connected with the first access node to being primarily connected instead with the second access node could involve (i) first transitioning the UE from receiving the EN-DC service to receiving standalone 4G LTE service from the first access node and (ii) after the first transitioning, then transitioning the UE from receiving the standalone 4G LTE service from the first access node to receiving standalone 5G NR service from the second access node.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for dynamically controlling connectivity of a user equipment device (UE) in a wireless communication system, the method comprising:
while the UE has dual connectivity with a first access node and a second access node, determining that power headroom of the UE on an air-interface connection between the UE and the second access node is threshold low; and
responsive to at least the determining, transitioning the UE from having the dual connectivity with the first access node and the second access node to instead having standalone connectivity with the second access node.

2. The method of claim 1, wherein, in the dual connectivity, the first access node is a master serving node of the UE, and the second access node is a secondary serving node of the UE.

3. The method of claim 2, wherein the method is carried out by the first access node.

4. The method of claim 1, wherein determining that the power headroom of the UE on the air-interface connection between the UE and the second access node is threshold low comprises receiving a report indicating that the power headroom of the UE on the second air-interface connection is threshold low.

5. The method of claim 1, wherein determining that the power headroom of the UE on the air-interface connection between the UE and the second access node is threshold low comprises determining that the power headroom of the UE on the air-interface connection between the UE and the second access node is at least as low as a predefined low-threshold level.

6. The method of claim 1, wherein, in the dual connectivity, the UE applies dynamic power sharing to control uplink transmit power of the UE, wherein the dynamic power sharing process includes using power headroom of the UE on an air-interface connection between the UE and the first access node as a basis to set a maximum uplink transmit power limit of the UE on the air-interface connection between the UE and the second access node.

7. The method of claim 6, wherein, with the dynamic power sharing, threshold low power headroom of the UE on the air-interface connection between the UE and the first access node correlates with threshold low power headroom on the air-interface connection between the UE and the second access node, and
   wherein determining that the power headroom of the UE on the air-interface connection between the UE and the second access node is threshold low comprises determining that the power headroom of the UE on the air-interface connection between the UE and the first access node is threshold low.

8. The method of claim 1, wherein the power headroom of the UE on the air-interface connection between the UE and the second access node is computed by subtracting, from a maximum transmit power limit of the UE on the air-interface connection, a transmit power at which, according to a power-control process, the UE is to transmit on the air-interface connection,
   wherein the power headroom is positive if the power at which the UE is to transmit on the air-interface connection is lower than the maximum transmit power limit of the UE on the air-interface connection, and
   wherein the power headroom is negative if the power at which the UE is to transmit on the air-interface connection is higher than the maximum transmit power limit of the UE on the air-interface connection.

9. The method of claim 1, wherein transitioning the UE from having the dual connectivity with the first access node and the second access node to instead having the standalone connectivity with the second access node comprises:
   first transitioning the UE from having the dual connectivity with the first access node and the second access node to instead having standalone connectivity with the first access node; and
   then transitioning the UE from having the standalone connectivity with the first access node to instead having the standalone connectivity with the second access node.

10. The method of claim 9, wherein the dual connectivity is EUTRA-NR Dual Connectivity (EN-DC), wherein the standalone connectivity with the first access node is 4G Long Term Evolution (4G LTE) connectivity, and wherein the standalone connectivity with the second access node is 5G New Radio (5G NR) connectivity.

11. A method for dynamically controlling connectivity of a user equipment device (UE) in a wireless communication system, the method comprising:
   while the UE has dual connectivity under a first radio access technology (RAT) and a second RAT, determining that second-RAT power headroom of the UE is threshold low;
   responsive to at least the determining, transitioning the UE from having the dual connectivity under the first RAT and the second RAT to instead having standalone connectivity under the second-RAT.

12. The method of claim 11, wherein, in the dual connectivity, the UE applies dynamic power sharing to control uplink transmit power of the UE, wherein the dynamic power sharing process includes using first-RAT power headroom of the UE as a basis to set a maximum second-RAT transmit power limit of the UE.

13. The method of claim 12, wherein, with the dynamic power sharing, threshold low first-RAT power headroom of the UE correlates with threshold low second-RAT power headroom of the UE, and wherein determining that the second-RAT power headroom of the UE is threshold low comprises determining that the first-RAT power headroom of the UE is threshold low.

14. A first access node configured to control connectivity of a user equipment device (UE) in a wireless communication system including the first access node and a second access node, wherein the first access node and second access node support cooperatively providing the UE with dual-connectivity service in which the UE is concurrently (i) primarily connected with and served by the first access node over a first air-interface connection between the UE and the first access node and (ii) secondarily connected with the second access node over a second air-interface connection between the UE and the second access node, the first access node comprising:
   a wireless communication interface through which the first access node is configured to provide the service on the first air-interface connection;
   a network communication interface though which the first access node is configured to engage in backhaul communication; and
   a controller configured to carry out operations including:
      while the first and second access nodes are providing the UE with the dual-connectivity service, determining that power headroom of the UE on the second air-interface connection between the UE and the second access node is threshold low, and
      responsive to at least the determining while the first and second access nodes are providing the UE with the dual-connectivity service that the power headroom of the UE on the second air-interface connection is threshold low, handing over the UE from being primarily connected with the first access node to being primarily connected instead with the second access node.

15. The first access node of claim 14, wherein the controller comprises at least one processing unit, non-transitory data storage, and program instructions stored in the non-transitory data storage and executable by the at least one processing unit to carry out the operations.

16. The first access node of claim 14, wherein, in the dual-connectivity service, the UE applies dynamic power sharing to control uplink transmit power of the UE on the first and second air-interface connections, wherein the dynamic power sharing process includes using power headroom of the UE on the first air-interface connection as basis to set a maximum transmit power limit of the UE on the second air-interface connection,
   wherein determining that the power headroom of the UE on the second air-interface connection is threshold low comprises determining that the power headroom of the UE on the first air-interface connection is threshold low.

17. The first access node of claim 14, wherein determining that the power headroom of the UE on the second air-interface connection is threshold low comprises receiving a report indicating that the power headroom of the UE on the second air-interface connection is threshold low.

18. The first access node of claim 14, wherein the power headroom of the UE on the second air-interface connection is computed by subtracting, from a maximum transmit power limit of the UE on the second air-interface connection, a transmit power at which, according to a power-control process, the UE is to transmit on the second air-interface connection, wherein the power headroom is positive if the power at which the UE is to transmit on the second air-interface connection is lower than the maximum transmit power limit of the UE on the second air-interface connection, and wherein the power headroom is negative if the power at which the UE is to transmit on the second air-interface connection is higher than the maximum transmit power limit of the UE on the second air-interface connection.

19. The first access node of claim 14, wherein handing over the UE from being primarily connected with the first access node to being primarily connected instead with the second access node comprises de-configuring the dual-connectivity service of the UE to transition the UE to standalone connectivity with the first access node and then handing over the UE from the standalone connectivity with the first access node to standalone connectivity instead with the second access node.

20. The first access node of claim 14, wherein the dual-connectivity service comprises EUTRA-NR Dual Connectivity (EN-DC) service in which the first access node provides the UE with 4G Long Term Evolution (4G LTE) service and the second access node provides the UE with 5G New Radio (5G NR) service, and wherein handing over the UE from being primarily connected with the first access node to being primarily connected instead with the second access node comprises:

first transitioning the UE from receiving the EN-DC service to receiving standalone 4G LTE service from the first access node; and after the first transitioning, then transitioning the UE from receiving the standalone 4G LTE service from the first access node to receiving standalone 5G NR service from the second access node.

\* \* \* \* \*